US006174555B1

(12) United States Patent
Leas et al.

(10) Patent No.: US 6,174,555 B1
(45) Date of Patent: Jan. 16, 2001

(54) SOFT COATING FOR ICE CONFECTIONERY

(75) Inventors: Alain Leas, Dublin, OH (US); Junkuan Wang, Lausanne (CH)

(73) Assignee: Nestec S.A., Vevey (CH)

( * ) Notice: Under 35 U.S.C. 154(b), the term of this patent shall be extended for 0 days.

(21) Appl. No.: 09/282,850

(22) Filed: Mar. 31, 1999

(51) Int. Cl.$^7$ .............. A23G 3/00; A23G 9/00; A23G 9/24

(52) U.S. Cl. .......... 426/100; 426/101; 426/306; 426/602; 426/631; 426/660

(58) Field of Search ................... 426/100, 101, 426/302, 306, 307, 565, 572, 602, 611, 612, 660, 98, 99, 804, 631, 659

(56) References Cited

U.S. PATENT DOCUMENTS

| | | | |
|---|---|---|---|
| 4,446,166 | 5/1984 | Giddey et al. | 426/631 |
| 4,637,937 | * 1/1987 | Terada et al. . | |
| 4,663,176 | * 5/1987 | Arden . | |
| 5,026,548 | * 6/1991 | Evans et al. . | |
| 5,120,566 | 6/1992 | Baba et al. | 426/631 |
| 5,149,560 | 9/1992 | Kealey et al. | 426/602 |
| 5,160,760 | 11/1992 | Takemori et al. | 426/660 |
| 5,271,950 | * 12/1993 | Yamaguchi et al. . | |
| 5,425,957 | * 6/1995 | Gaim-Marsoner et al. . | |
| 5,460,847 | 10/1995 | Kawabata et al. | 426/631 |
| 5,464,649 | * 11/1995 | St. John et al. . | |
| 5,468,509 | 11/1995 | Schlup et al. | 426/548 |
| 5,486,376 | 1/1996 | Alander et al. | 426/660 |
| 5,527,556 | 6/1996 | Frippiat et al. | 426/573 |
| 5,556,659 | 9/1996 | De Pedro et al. | 426/302 |
| 5,965,179 | * 10/1999 | Ducret et al. . | |

FOREIGN PATENT DOCUMENTS

| | | | |
|---|---|---|---|
| 2215170 | 3/1998 | (CA) | A23G/1/00 |
| 0401427 | 12/1990 | (EP) | A23G/1/00 |
| 0442324 | 8/1991 | (EP) | A23G/1/00 |
| 1538750 | 1/1979 | (GB) | A23G/1/00 |
| 54-140773 | 11/1979 | (JP) | A23G/1/00 |
| 61-56971 | 12/1986 | (JP) | A23G/1/00 |
| 391443 | 4/1991 | (JP) | A23G/1/00 |
| 3228647 | 10/1991 | (JP) | A23G/1/00 |
| 475556 | 3/1992 | (JP) | A23G/1/00 |
| 4281744 | 10/1992 | (JP) | A23G/1/00 |
| 5284911 | 11/1993 | (JP) | A23G/1/00 |
| 6189682 | 7/1994 | (JP) | A23G/1/00 |

OTHER PUBLICATIONS

Copy of Traitler, et al., U.S. Pat. Application 08/935,427, as filed, Sep. 23, 1997.

Beckett, Editor, Industrial Chocolate Manufacture and Use, Second Edition, 1994 Blackie Academic & Professional, London, U.K., pp. 146–154.

Minifie, Chocolate, Cocoa and Confectionery; Science and Technology, Third Edition, 1989 Chapman and Hall, N.Y., N.Y., U.S.A., pp. 117–123.

USPTO file Abstract of Japanese Patent Document No. 6—189682.

USPTO file Abstract of Japanese Patent Document No. 5—284911.

USPTO file Abstract of Japanese Patent Document No. 4—281744.

USPTO file Abstract of Japanese Patent Document No. 4—75556.

USPTO file Abstract of Japanese Patent Document No. 3—288647.

USPTO file Abstract of Japanese Patent Document No. 3—91443.

USPTO file Abstract of Japanese Patent Document No. 60—56971.

USPTO file Abstract of Japanese Patent Document No. 54—140773.

Database Abstract, Derwent Information, Ltd., WPI Accession No. 87–291818/42; abstract of Menzi et al., Swiss Patent CH 662 041 (1987).

* cited by examiner

Primary Examiner—Cynthia L. Nessler
(74) Attorney, Agent, or Firm—Vogt & O'Donnell, LLP

(57) ABSTRACT

A water-containing chocolate composition, which is particularly suitable for being combined with an ice confectionery composition as a coating upon or as an inclusion in the ice confectionery composition to provide a composite composition, is an admixture of chocolate and of a water-in-oil emulsion which includes a vegetable oil and milk fat. By weight based upon the composition weight, the water is present in an amount of from 10% to 30%, fat substances are present in an amount of from 35% to 45% and carbohydrates are present in an amount of from 30% to 40%.

21 Claims, No Drawings

SOFT COATING FOR ICE CONFECTIONERY

BACKGROUND OF THE INVENTION

The present invention relates to fat-containing confectionery compositions and particularly to chocolate compositions and more particularly to chocolate compositions which contain water, and the invention relates to fat-containing confectionery compositions suitable as a coating for or as an inclusion in an ice confectionery composition.

In a conventional fat-coated ice cream product, for example an ice lolly, bar, morsel, cone, cup or cake, the fat may account for some 45–60% by weight of the coating. In ice cream products with conventional fat-based coatings, the fat gives some brittleness to the coating and the coating does not properly adhere to the ice confectionery core.

Thus, it would be desirable to provide a coating composition which has a soft texture, good adhesion on ice and good storage and heat-shock resistance and a good chocolate flavor and which is able to be processed in a conventional coating operation.

In U.S. Pat. No. 5,556,659 there is disclosed a process for coating a frozen confectionery product in which the coating composition is calorie reduced in that it is in the form of a water-in-oil emulsion, wherein the emulsion comprises 40 to 55% by weight water, 2 to 4% by weight of an emulsifier system comprising decaglycerine decaoleate, and less than about 3% by weight water-soluble compounds. This coating was designed to reduce calories while keeping the crispness/brittleness.

In U.S. Pat. No. 5,120,566 there is disclosed a composition for enrobing ice confectionery based on a water-in-oil emulsion, in which the emulsifier system is a low hydrophilic lipophylic balance sugar fatty ester and which contains a nut paste.

SUMMARY OF THE INVENTION

We have found that it is possible to produce a soft coating, by incorporating a water-in-oil emulsion into conventional chocolate or products similar to chocolate (the term chocolate will be employed hereinafter to designate chocolate and products similar thereto), which has texture and flavor properties superior to conventional fat-based coatings and significantly better keeping properties, creaminess, softness, e.g. less brittleness, and better adhesion to ice confectionery.

Accordingly, the present invention provides a composition for use with ice confectionery products, which comprises by weight, a total fat content of 35 to 45% of which 5 to 15% is vegetable oil, 5 to 15% is milk fat and 20 to 30% is cocoa butter or cocoa butter replacers, 10 to 30% water and a total carbohydrates of 30 to 40% of which 0 to 10% may be invert sugar, 0 to 10% may be non fat milk solids, and in which about 50–80% of the components come from chocolate and about 20–50% come from a water-in-oil emulsion containing the vegetable oil, the milk fat, the invert sugar and the water and said emulsion comprising 0.5 to 2% of a low hydrophilic lipophylic balance emulsifier system comprising polyglycerolpolyricinoleate and monoglyceride.

DETAILED DESCRIPTION OF THE INVENTION

In the context of the present invention, the coating composition is not limited to surface coating. The coating composition may be used in applications where alternate layers of ice confectionery and coating are made to create layered products. It may also be used to form solid pieces which may be used, for instance, in place of chocolate inclusions.

The ice confectionery product may be ice cream, iced milk, sherbet, sorbet, frozen yoghurt or frozen mousse. It may be more or less aerated. It may contain marbling, e.g. of sauce or inclusions.

Advantageously, the emulsifier of the pre-emulsion is a mixture of polyglycerol polyricinoleate (PGPR) and monoglyceride with a global hydrophilic lipophilic balance (HLB) of preferably <3, and the monoglyceride may be an unsaturated monoglyceride. With respect to the water phase, cream may be preferably used.

Other ingredients may be present including sweeteners, flavorings or colorants, the proportions of which may be determined according to taste and/or appearance. Cocoa solids non-fat which may come from cocoa liquor or cocoa powder may be used as flavorings.

With respect to the fat phase, a liquid vegetable oil, such as, e.g. sunflower, canola, soybean, peanut oil, or any liquid oil at room temperature or any mix of these may be used. Milk fat or any fraction of it can also be used.

The coating composition may further contain crispy inclusions, e.g. cereals, like expanded or toasted rice or dried fruit pieces which must be coated in moisture barriers to delay the absorption of moisture from the coating, which would result eventually in their sogginess.

The invention further provides a method for production of the previously defined coating composition, which comprises separately mixing water, ingredients of the aqueous phase with an aroma and sweetening agents to make what is referred to herein as the aqueous phase, separately mixing a fat with the emulsifier at a temperature where the fat is liquid to make what is referred to herein as the fat phase, and slowly introducing the aqueous phase into the fat phase while mixing to prepare an emulsion, and then further progressively mixing with molten chocolate.

The aqueous phase may preferably be pasteurized, e.g. in a high temperature short time (HTST) mix plant consisting of high shear mix tank, plate heating/cooling exchanger, holding tubes and optionally an homogenizer. As an alternative, the heat exchanger may comprise a shell and tube heating/cooling unit without an homogenizer.

The coating composition is prepared by mixing the emulsifier in the molten fat at a temperature of 20 to 50° C., preferably between 30 and 40° C. Then the aqueous phase is separately warmed up to a temperature of 20 to 50° C., preferably between 30 and 40° C. and progressively added to the fat phase under fine flow and agitation as a pre-emulsification step, thus forming a water-in-oil pre-emulsion.

To achieve a desired viscosity for application, the formed water-in-oil pre-emulsion is further sheared. This can be done either in batch with a U-shape stirring rod agitator at a higher speed, in a colloidal mill, or continuously with a rotor/stator dispersing device or pumping the pre-emulsion through a static mixer with a high flow speed to form a fine emulsion. An in-line rotor/stator dispersing device or/and static mixer is preferred for a better consistency.

Chocolate is melted at about 40° C. and lecithin is preferably added under mixing until homogeneous. The melted chocolate is then progressively added to the emulsion at about 40° C. and mixed at low speed at 20 to 50° C., preferably between 30 and 40° C. until homogeneous.

Preferably the final composition can be stored at a positive temperature of about 35° C. under slow agitation until ready to use, preferably within 24 h. Alternately it can be solidified at about 20–22° C. and be kept refrigerated or frozen. It can be slowly melted and well mixed for re-use whilst recovering its initial properties.

Additionally, with regard to amounts employed, the chocolate and emulsion may be combined in amounts, by weight, to provide an admixture which comprises from about 50 to 70% chocolate and from about 30 to 50% emulsion and particularly about 60% chocolate and about 40% emulsion.

The invention further provides a method for coating a piece of frozen confectionery which comprises dipping the piece in a previously defined coating composition at a temperature of 28 to 40° C.

The setting time of such a coating is between 45 and 90 s.

The products obtained with this method have very good resistance to melting at about 20° C. compared to water-based coatings containing a pure aqueous phase which have a poor resistance to melting. In addition, water-based coatings need special equipment for subsequent cooling, sometimes at very low temperature to freeze the coating, which is not necessary with the present coating. In addition, the present coating, whilst still frozen, has a texture much softer than what is normally found in chocolate-based ice cream coatings, which typically shatter when bitten. At the same time, it does not have the apparent coldness of a sorbet or fruit juice type of coating. When bitten into, it will deform but not crack, and will have a creamy texture. Also, by its soft and coherent nature, it will adhere to the piece and remain in place on the piece during consumption and will not drip readily whilst melting.

There may also be other layers of coating inside or outside, e.g. of fudge or thin layer of crispy chocolate, giving a textural contrast.

The invention further provides a method for molding pieces of frozen confectionery which comprises inserting a liquid coating in a mold and sucking back the excess liquid coating to form a shell, filling in the shell with ice cream, backing off with additional liquid coating, optionally inserting a stick and demolding, e.g. by heating.

Ice cream pieces, portions, morsels, domes or cakes may also be coated using an enrober wherein the coating falls on the ice cream pieces while they are moving.

The invention is also related to the use of the coating composition to form a layer or an inclusion in an ice confectionery product.

In a first application of the coating, the coating composition is dropped onto a belt or band or into a mold followed by cooling to form solid pieces, e.g. drops of coating which can be used as inclusions in an ice confectionery product.

In a second application, the coating composition can be sprayed to form a layer on the surface of an ice confectionery product or layers inside an ice confectionery product to form a multilayered product.

In a further application of the coating composition, the liquid coating composition can be co-extruded with ice confectionery from a die to form a coating, a center or ripple.

EXAMPLES

The following Examples further illustrate the present invention, in which percentages and parts are expressed by weight unless otherwise specified.

Example 1

An aqueous phase is prepared by mixing 22.4 kg fresh lactic cream containing 36% fat, preheated at 50–55° C., 2.8 kg invert sugar preheated at 50–55° C., 1.4 kg skim milk powder and 1.4 kg water preheated at 50–55° C. in a jacketed kettle maintained at 50–55° C. After pasteurization at 82° C./25 s, the aqueous phase can be cooled to 4–6° C. and stored until further use and then heated up in a plate heat exchanger to 40° C., or if used directly, brought to 40° C.

A fat phase is separately prepared by mixing 9 kg sunflower oil heated at 40° C., 2.28 kg anhydrous butter oil melted at 40° C. and 0.3 kg PGPR and 0.42 kg distilled unsaturated monoglyceride melted at 40° C.

The aqueous phase is progressively (fine flow) added to the fat phase in a jacketed kettle with a U-shape stirring rod and mixed under high speed (about 70 rpm), thus forming a water-in-oil pre-emulsion. The agitation is continued at the same speed for 20 min., and then the agitation speed is decreased at about half the previous speed. The pre-emulsion is then transfered through a static mixer to form a fine emulsion.

In a separate kettle 59.7 kg of dark chocolate premelted at 40° C. is mixed with 0.3 kg soya lecithin and the mixture is pumped into the final mixing tank containing the emulsion while mixing until homogeneous. The finished coating can be kept at about 35° C. with slow agitation until ready for dipping ice cream bars.

Extruded ice cream stick bars with 80% overrun at a temperature of about −25° C. are dipped into the above final coating at 35–40° C. After a certain time to allow the coating to set, the finished product is individually wrapped in flow packs and stored at −18° C.

Example 2

The method of Example 1 is repeated for preparing a coating using milk chocolate instead of dark chocolate.

Extruded regular ice cream stick bars with 100% overrun are dipped into the thus prepared coating in the same way as in Example 1.

Example 3

Ice cream portions are prepared using an ice cream mix with 58.5% water, 31.9% solids non-fat, 9.6% fat and 100% overrun. The portions are then passed through a freezing tunnel and completely frozen at −22° C. Finally the portions are enrobed with the coating composition of Example 1 at 38° C. The portions obtained were adequately covered with a uniform layer of coating which stuck properly to the surface.

This method is also suitable for preparing bars and bite-size pieces.

Example 4

Cells of a stick machine in a brine tank of −38° C. are filled with the coating of Example 2 at 35° C. After 10 s, excess coating composition is sucked-back and sorbet of 40% overrun is deposited into the thus formed shells. After insertion of sticks and backing off with more coating at 35° C., the ice sticks are demoulded by heating at 12° C. and flow-wrapped.

We claim:

1. A water-containing chocolate composition which comprises:
   fat substances which comprise a vegetable oil, milk fat and further, a chocolate fat substance which is selected from the group consisting of cocoa butter, a cocoa butter replacer and a cocoa butter analog, wherein the fat substances are in an amount, by weight based upon the composition weight, of from 35% to 45% and wherein, by weight based upon the composition weight, the vegetable oil is in an amount of from 5% to 15%, the milk fat is in an amount of from 5% to 15% and the chocolate fat substance is in an amount of from 20% to 30%;

water in an amount, by weight based upon the composition weight, of from 10% to 30%;

carbohydrate substances in an amount, by weight based upon the composition weight, of from 30% to 40% and wherein the carbohydrate substances comprise an invert sugar in an amount of up to 10% and comprise non-fat milk solid carbohydrates in an amount of up to 10%; and wherein the composition is an admixture of a chocolate and a water-in-oil emulsion wherein the emulsion comprises the vegetable oil, the milk fat and water and when present, the invert sugar and the non-fat milk solids, and wherein the emulsion further comprises a low hydrophilic lipophilic balance emulsifier system comprising polyglycerolpolyricinoleate and a monoglyceride in an amount, by weight based upon the emulsion weight, of from 0.5% to 2% and wherein the chocolate and emulsion are combined in amounts, by weight based upon the composition weight, of from about 50% to 80% chocolate and from about 20% to 50% emulsion.

2. A composition according to claim 1 wherein the invert sugar is present in the composition.

3. A composition according to claim 1 or 2 wherein the non-fat milk solid carbohydrates are present in the composition.

4. A composition according to claim 1 wherein the monoglyceride is an unsaturated monoglyceride.

5. A composition according to claim 1 or 4 wherein the emulsifier system has a global hydrophilic lipophilic balance of less than 3.

6. A composition according to claim 1 wherein the milk fat is cream.

7. A composition according to claim 1 wherein the chocolate and emulsion are combined in amounts of from about 50% to 70% chocolate and from about 30% to 50% emulsion.

8. A composition according to claim 1 wherein the chocolate and emulsion are combined in amounts of about 60% chocolate and about 40% emulsion.

9. A composition according to claim 1 wherein the vegetable oil is selected from the group consisting of sunflower oil, canola oil, soybean oil and peanut oil.

10. A composition according to claim 1 which further comprises substances selected from the group consisting of sweeteners, flavorings and colorants.

11. A composite confectionery composition comprising an ice confectionery composition and a water-containing chocolate composition wherein the water-containing chocolate composition is combined with the ice confectionery composition as a member selected from the group consisting of a coating layer upon the ice confectionery composition and an inclusion in the ice confectionery composition and wherein the water-containing chocolate composition comprises:

fat substances which comprises a vegetable oil, milk fat and further, a chocolate fat substance which is selected from the group consisting of cocoa better, a cocoa butter replacer and a cocoa butter analog, wherein the fat substances are in an amount, by weight based upon the composition weight, of from 35% to 45% and wherein, by weight based upon the composition weight, the vegetable oil is in an amount of from 5% to 15%, the milk fat is in an amount of from 5% to 15%, and the chocolate fat substance is in an amount of from 20% to 30%;

water in an amount, by weight based upon the composition weight, of from 10% to 30%;

carbohydrate substances in an amount, by weight based upon the composition weight, of from 30% to 40% and wherein the carbohydrate substances comprise an invert sugar in an amount of up to 10% and comprise non-fat milk solid carbohydrates in an amount of up to 10%; and wherein the composition is an admixture of a chocolate and a water-in-oil emulsion wherein the emulsion comprises the vegetable oil, the milk fat and water and when present, the invert sugar and the non-fat milk solids, and wherein the emulsion further comprises a low hydrophilic lipophilic balance emulsifier system comprising polyglycerolpolyricinoleate and a monoglyceride in an amount, by weight based upon the emulsion weight, of from 0.5% to 2% and wherein the chocolate and emulsion are combined in amounts, by weight based upon the composition weight, of from about 50% to 80% chocolate and from about 20% to 50% emulsion.

12. A composite composition according to claim 11 wherein the invert sugar is present in the water-containing chocolate composition.

13. A composite composition according to claim 11 or 12 wherein the non-fat milk solid carbohydrates are present in the water-containing chocolate composition.

14. A composite composition according to claim 11 wherein the monoglyceride is an unsaturated monoglyceride.

15. A composite composition according to claim 11 or 14 wherein the emulsifier system has a global hydrophilic lipophilic balance of less than 3.

16. A composite composition according to claim 11 wherein the milk fat is cream.

17. A composite composition according to claim 11 wherein the chocolate and emulsion are combined in amounts of from about 50% to 70% chocolate and from about 30% to 50% emulsion.

18. A composite composition according to claim 11 wherein the chocolate and emulsion are combined in amounts of about 60% chocolate and about 40% emulsion.

19. A composite composition according to claim 11 wherein the vegetable oil is selected from the group consisting of sunflower oil, canola oil, soybean oil and peanut oil.

20. A composite composition according to claim 11 which further comprises substances selected from the group consisting of sweeteners, flavorings and colorants.

21. A composite composition according to claim 11 wherein the ice confectionery composition is selected from the group consisting of ice cream, iced milk, sherbert, sorbet, frozen yoghurt and frozen mouse.

* * * * *